(12) United States Patent
Bhatia et al.

(10) Patent No.: US 10,095,972 B2
(45) Date of Patent: Oct. 9, 2018

(54) SWITCHABLE RFID ANTENNAS RESPONSIVE TO AN ENVIRONMENTAL SENSOR

(71) Applicant: TEMPTIME CORPORATION, Morris Plains, NJ (US)

(72) Inventors: Ravi Bhatia, Cedar Knolls, NJ (US); Mohannad Abdo, Clifton, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 0 days.

(21) Appl. No.: 15/445,363

(22) Filed: Feb. 28, 2017

(65) Prior Publication Data
US 2017/0255854 A1 Sep. 7, 2017

Related U.S. Application Data

(60) Provisional application No. 62/301,831, filed on Mar. 1, 2016.

(51) Int. Cl.
*G06K 19/06* (2006.01)
*G06K 19/077* (2006.01)

(52) U.S. Cl.
CPC ... *G06K 19/0775* (2013.01); *G06K 19/07745* (2013.01)

(58) Field of Classification Search
CPC ........... G06K 19/0717; G06K 19/0723; G06K 2017/0077
USPC ........................................................ 235/492
See application file for complete search history.

(56) References Cited

U.S. PATENT DOCUMENTS

| | | |
|---|---|---|
| 4,646,066 A | 2/1987 | Baughman et al. |
| 6,642,016 B1 | 11/2003 | Sjoholm et al. |
| 7,098,794 B2 | 8/2006 | Lindsay et al. |
| 7,503,690 B2 | 3/2009 | Song et al. |
| 7,570,169 B2 | 8/2009 | Li et al. |
| 7,604,398 B1 | 10/2009 | Akers et al. |
| 7,719,404 B2 | 5/2010 | Makela et al. |
| 8,040,243 B2 * | 10/2011 | Bommer ............ G06K 19/0717 340/10.41 |

(Continued)

FOREIGN PATENT DOCUMENTS

| | | |
|---|---|---|
| CN | 103543146 | 1/2014 |
| JP | 5723474 | 5/2015 |

(Continued)

OTHER PUBLICATIONS

Bhattacharyya et al., "Low-Cost, Ubiquitous RFID-Tag-Antenna-Based Sensing", Proceedings of the IEEE 2010, 98, 1593-1600.

(Continued)

*Primary Examiner* — Seung Lee
(74) *Attorney, Agent, or Firm* — K&L Gates LLP (57) ABSTRACT

Systems for switchable RFID tags responsive to an environmental sensor are provided. In one embodiment, the system includes a primary RFID tag and a secondary RFID tag, and a switch being associated with the primary RFID tag and the secondary RFID tag in a manner that the primary RFID tag and the secondary RFID tag are not activated at the same time. Each RFID tag may include an integrated circuit and an antenna. The system may also include at least two first electrical terminals electrically connecting the primary RFID tag to the switch, and at least two second electrical terminals electrically connecting the secondary RFID tag to the switch.

20 Claims, 5 Drawing Sheets

(56) References Cited

U.S. PATENT DOCUMENTS

| | | |
|---|---|---|
| 8,228,172 B2 | 7/2012 | Collins et al. |
| 8,267,576 B2 | 9/2012 | Haarer et al. |
| 8,395,521 B2 | 3/2013 | Kauffman et al. |
| 8,870,082 B2 | 10/2014 | Cattaneo et al. |
| 8,899,829 B1 | 12/2014 | Butera et al. |
| 8,968,662 B2 | 3/2015 | Haarer et al. |
| 9,011,794 B2 | 4/2015 | Haarer et al. |
| 9,195,925 B2 | 11/2015 | Potyrailo et al. |
| 2004/0061655 A1 | 4/2004 | Forster et al. |
| 2006/0261946 A1 | 11/2006 | Himberger et al. |
| 2007/0210923 A1 | 9/2007 | Butler et al. |
| 2008/0292507 A1 | 11/2008 | Dee et al. |
| 2009/0010304 A1 | 1/2009 | Skinner et al. |
| 2009/0066516 A1 | 3/2009 | Lazo |
| 2010/0090802 A1 | 4/2010 | Nilsson et al. |
| 2012/0260728 A1 | 10/2012 | Bhattacharyya et al. |
| 2013/0033364 A1 | 2/2013 | Raz et al. |
| 2013/0224875 A1 | 8/2013 | Haarer et al. |
| 2014/0148095 A1 | 5/2014 | Smith et al. |
| 2014/0154808 A1 | 6/2014 | Patel |
| 2014/0358099 A1* | 12/2014 | Durgin .................... A61F 13/42 604/361 |

FOREIGN PATENT DOCUMENTS

| | | |
|---|---|---|
| KR | 101519317 | 5/2015 |
| WO | WO03/044521 | 5/2003 |
| WO | WO2014113247 | 10/2014 |
| WO | WO2015113086 | 8/2015 |

OTHER PUBLICATIONS

Windl et al., "Reactivatable Passive Radio-Frequency Identification Temperature Indicator", Journal of Applied Physics 117, 17C125 (2015).

Tanguy et al. "Enhanced Radio Frequency Biosensor for Food Quality Detection Using Functionalized Carbon Nanofillers", ACS Appl. Mater. Interfaces 2015, 7, 11939-11947.

Wu et al., "3D-Printed Microelectronics for Integrated Circuitry and Passive Wireless Sensors", Microsystems & Nanoengineering 1, 15013 (2015).

Wan et al., "A New Type of TTI Based on Electrochemical Pseudo Transistor", J. of Food. Engin. 168, (2016) 79-83.

Search Report and Written Opinion dated Jul. 17, 2017 issued for International PCT Application No. PCT/US17/20142.

\* cited by examiner

SWITCHABLE RFID ANTENNAS RESPONSIVE TO AN ENVIRONMENTAL SENSOR

PRIORITY CLAIM

This application claims the benefit of U.S. provisional patent application no. 62/301,831 filed on Mar. 1, 2016, the entire disclosure of which is incorporated by reference herein for all purposes.

BACKGROUND

Many commercial products are sensitive to temperature conditions, such as freezing, thawing, high or low temperatures, and/or extended periods of time at elevated temperature, and may lose efficacy or quality under any of these conditions. Examples of temperature-sensitive commercial products include certain pharmaceuticals, medical products, and foodstuffs as well as some industrial products. There is a continued need for an environmental sensor system to detect such changes.

SUMMARY

The present disclosure provides new and innovative systems for an environmental sensor to detect environmental changes. In an example embodiment, a system includes a primary RFID tag and a secondary RFID tag. Each RFID tag includes an antenna and an integrated circuit electrically connected to the antenna. The system further includes a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time. The system also includes at least two first electrical terminals electrically connecting the primary RFID tag to the switch and at least two second electrical terminals electrically connecting the secondary RFID tag to the switch.

In an example embodiment, a system includes a RFID tag having an antenna and an integrated circuit electrically coupled to the antenna, a plurality of sensor devices electrically coupled to the integrated circuit, and an electrical connection between the integrated circuit and the plurality of sensor devices. The integrated circuit is configured to sense whether each of the plurality of sensor device is in a conductive state or in a non-conductive state, and produce a different output based on the state of the each of the plurality of sensor devices. The output is adapted to be transmitted through the antenna to a reader.

In an example embodiment, a product includes a host product, a container containing the host product, and the system mentioned above. The system is attachable to the container.

Additional features and advantages of the disclosed systems are described in, and will be apparent from, the following Detailed Description and the Figures.

DETAILED DESCRIPTION OF EXAMPLE EMBODIMENTS

Administration of vaccines provides a cost-effective health intervention that can save or improve, millions of lives globally. The biological activity of vaccines is attributable to complex organic macromolecules, for example, proteins, having particular three-dimensional conformations. When exposed to extremes in temperature, including freezing temperatures or near-freezing temperatures, high temperatures, or warm temperatures for an extended period of time, vaccines can lose potency. A low-potency vaccine, if administered to a subject, may fail to protect the subject from a serious or fatal disease.

Warm temperatures can also affect vaccine quality adversely. Because of this, vaccines are generally refrigerated, or cooled by other suitable means, during storage and distribution to end-users. Such cooling means may introduce a risk that some or all vaccine samples in a batch of samples may suffer exposure to freezing or near-freezing temperatures due to cold spots within the container, poorly controlled refrigeration, or other factors. Similar considerations apply to various other commercial products, for example other medical products, biological pharmaceuticals in some genetically engineered pharmaceuticals, food stuffs, and other commercial products, some of which are described elsewhere herein.

To help mitigate problems associated with undesirable temperature conditions, a sensor system can be associated with the vaccine, or another host product that is thermally sensitive, to provide an alerting to a health worker or other end-user, that the vaccine or the host product may have lost potency and possibly should not be used.

Use of RFID tags can permit efficient retrieval of information regarding an item at various points in the manufacturing and distribution chain, and can also permit tracking of the individual item. Some RFID tags permit relatively large amounts of data to be associated with the product. An RFID tag may include a memory, an RF transmitter, an RF receiver, an antenna, and logic for controlling the various components of the memory device. The antenna may be formed on a flexible substrate, while analog RF circuits and digital logic and memory circuits are embodied in an integrated circuit ("IC") carried by the substrate and coupled to the antenna. The integrated circuit may store and process information, modulate and demodulate RF signals, and perform other specialized functions. RFID tags may also include a number of discrete electronic components, such as capacitors, transistors, and diodes.

RFID tags can be either passive or active devices. Active devices are self powered, typically by a battery. Passive devices, which are often cheaper and have no issues with battery life, lack their own power source and derive energy from the RF signal used to interrogate the RFID tag. Passive RFID tags usually include an analog circuit, which detects and decodes the interrogating RF signal and which provides power from the RF field to a digital circuit in the tag. The digital circuit generally executes all of the functions performed by the RFID tag, such as retrieving stored data from memory and modulating the RF signal to transmit the retrieved data. In addition to retrieving and transmitting data previously stored in the memory, the RFID tag can permit new or additional information to be stored into the RFID tag's memory, or can permit the RF tag to manipulate data or perform some additional functions.

Figure 1:
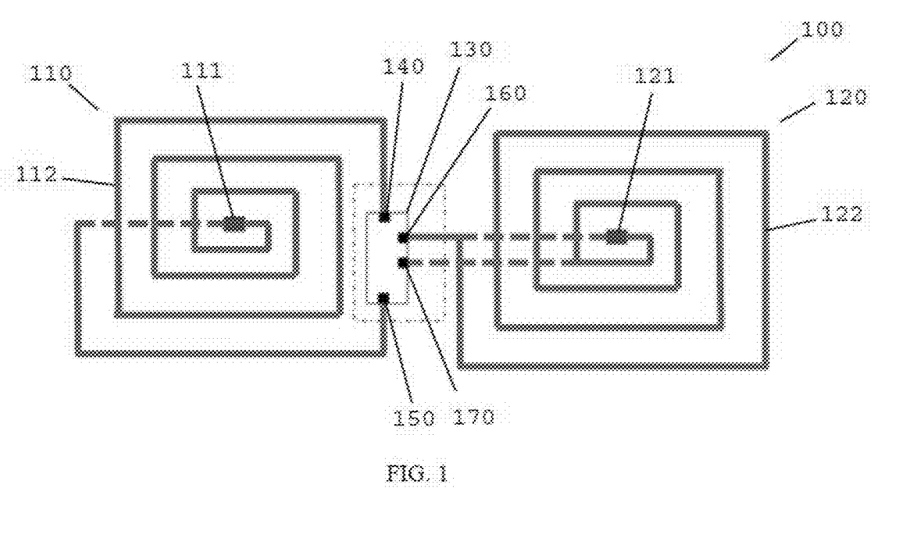
FIG. 1 is a diagram of a sensor system according to an embodiment of the present disclosure.

FIG. 1 depicts a high-level component diagram of an example sensor system 100 in accordance with one or more aspects of the present disclosure. The sensor system 100 may include a primary RFID tag 110 and a secondary RFID tag 120. Each RFID tag may include an integrated circuit 111, 121, which may also include an onboard capacitor, and an antenna 112, 122. The antennas 112, 122 may be configured to send and receive RF signals to a RFID reader (not shown). The system 100 may also include a switch 130 being electrically connected to the antenna 112 of the primary RFID tag 110 and the antenna 122 of the secondary RFID tag 120. The switch 130 may be electrically connected with the primary RFID tag 110 and the secondary RFID tag 120 in a manner that the primary RFID tag 110 and the secondary RFID tag 120 are not activated at the same time. For example, the switch 130 may be electrically connected with the RFID tags 110, 120 in a manner that at most one of the primary RFID tag 110 and the secondary RFID tag 120 is activated at a time. In another example embodiment, the switch 130 may be electrically connected with the RFID tags in a manner that either the primary RFID tag 110 or the secondary RFID tag 120 is activated at a time. In an example embodiment, the primary RFID tag 110 or the secondary RFID tag 120 may be a passive RFID tag. In another example embodiment, the primary RFID tag 110 or the secondary RFID tag 120 may be an active RFID tag. As used herein, the term "electrically connected" may mean that the referenced elements are directly or indirectly connected in such a way as to allow electric current to flow between them.

The system 100 may include at least two first electrical terminals 140, 150 electrically connecting the primary RFID tag 110 to the switch 130. The system 100 may also include at least two second electrical terminals 160, 170 electrically connecting the secondary RFID tag 120 to the switch 130. In an example embodiment, the RFID tags may use high frequency (13.56 MHz) technology. However, it will be appreciated by one skilled in the art that the present disclosure is not limited to high frequency and that any known frequency may be used, such as low frequency (100 kHz or 125 kHz), ultra high frequency (860-930 MHz), and microwave frequency (2.45 GHz or 5.8 GHz), or other known frequencies.

The resonance frequency of the RFID tags may be designed to be slightly higher than the reader frequency because when an RFID tag is attached to an item, the inherent capacitance of the item may detune the resonant frequency of the RFID tag away from its free air resonant frequency, thus reducing its read range. Similarly, RFID tags may suffer from detuning when two or more tags are placed in each other's effective area. Therefore, these detuning factors may be considered in designing multi-tag applications.

Figure 2:
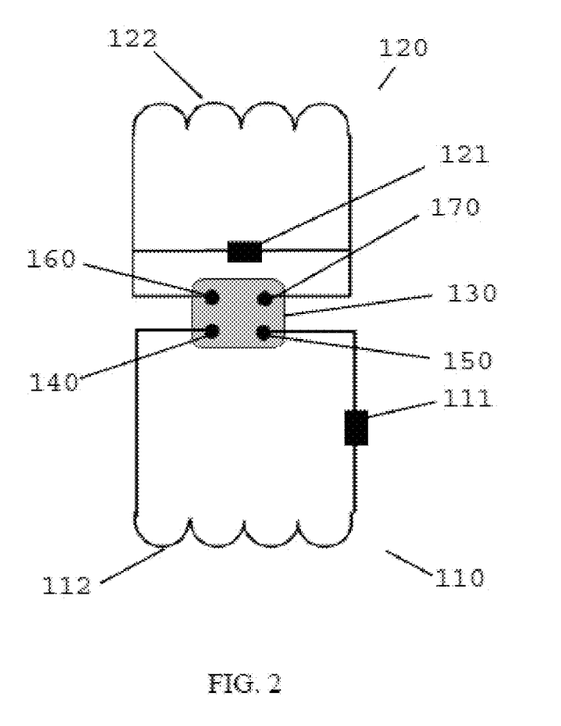
FIG. 2 is a schematic diagram of the system of FIG. 1.

FIG. 2 shows the electrical schematic of the sensor system 100. In an example embodiment, the switch 130 may have a conductive state (or a high conductive state) and a non-conductive state (or a low conductive state). When the switch 130 is in the conductive state, the switch 130 may complete an electrical connection from the antenna 112 of the primary RFID tag 110 with the integrated circuit 111 of the primary RFID tag 110 such that the primary RFID tag 110 is activated. When the switch 130 is in the conductive state, an electrical connection from the antenna 122 of the secondary RFID tag 120 with the integrated circuit 121 or the on-board capacitor within integrated circuit 121 of the secondary RFID tag 120 may be shorted such that the secondary RFID tag 120 is deactivated. Thus, there may be no reactive load from the secondary RFID tag 120 imposed on the antenna 112 of the primary RFID tag 110 and no detuning of the primary RFID tag 110 is caused. The term "activated", when used in relation to a RFID tag, may mean that the RFID tag is on-state such that the integrated circuit and the antenna of the tag can transmit or receive data, such as RFID codes or other identification information via one or more RF signals to or from a RFID reader. The term "inactivated", when used in relation to a RFID tag, may mean that the RFID is powered-off or unreadable by a reader. In an example embodiment, the RFID tag can be inactivated by a detuning of the tag.

When the switch 130 is in the non-conductive state, the switch 130 may open the electrical connection from the antenna 112 of the primary RFID tag 110 with the integrated circuit 111 of the primary RFID tag 110 such that the primary RFID tag 110 is deactivated and a short of the electrical connection from the antenna 122 of the secondary RFID tag 120 with the integrated circuit 121 of the secondary RFID tag 120 is removed such that the secondary RFID tag 120 is activated. Activating the RFID tag enables the integrated circuit and the antenna to transmit or receive data, such as RFID codes or other identification information via one or more RF signals to or from a RFID reader.

In an example embodiment, a change in the state of the switch 130 is permanent, providing an irreversible indication of a temperature event. In another example embodiment, the change in the state of the switch 130 is reversible and not permanent, providing a thermal history of the system 100. In an example embodiment, the switch 130 may be conductive in its default inactivated state. In another example embodiment, the switch 130 may be non-conductive in its default state.

In an example embodiment, the RFID tags 110, 120 may have a unique ID, which is used for their unique identification in the anti-collision process during reading. Because only one of the primary and secondary RFID tags is activated at a time when reading, a special reader may not be required, and a conventional RFID reader or RFID-enabled smartphone application can be used to read the data from the single activated RFID tag. In particular, the data read from the RFID tag and/or the RFID tag serial number may communicate whether or not the sensor device has been activated and, based on this information, a user can determine whether the sensed property is above or below threshold. Furthermore, as explained above, the RFID tags in the sensor system 100 may not suffer from detuning because only one of the primary and secondary RFID tags is activated at a time. Also, because at least one of the RFID tags is activated all the time, the system is always responsive to an interrogation by a RF reader.

In an example embodiment, the switch 130 may be a sensor device, such as, a thermal history sensor, a high-temperature threshold sensor, a low-temperature threshold sensor, a freeze sensor, a melt sensor, a time temperature sensor, and a combination of these sensors. The sensor device may be responsive to a specified sensed property, which is an environmental, physical, or biological condition. As the sensor device reaches a predetermined threshold value of the sensed property, the electrical conductivity of the sensor device may also change. For example, the sensor device may cause a change in conductivity in response to a change in temperature that is outside of a predetermined limit. Depending on the type of materials used for the sensor device, the temperature level that causes the change can be a particular temperature value or alternatively, a range of temperature values. In an example embodiment, the sensor device may also cause a change in conductivity after exposure to some given thermal history. In particular, the sensor device can be designed such that exposure to a particular temperature level over a predetermined time interval causes a change in the conductivity level.

In an example embodiment, the activation process of the sensor device is rapid such that the sensor device has a very narrow temperature threshold range. In particular, the change from the low conductivity state to the high conductivity state and vice versa is instantaneous.

In an example embodiment, the switch 130 may be an electrical sensor. For example, the switch 130 may be comprised of electrical components including resistors, capacitors or inductors and/or semiconductor components such as field effect transistors that further enhance its change in conductance when the sensor device changes state due to the sensed property. In another example embodiment, the switch 130 may be a chemical sensor.

Figure 3:
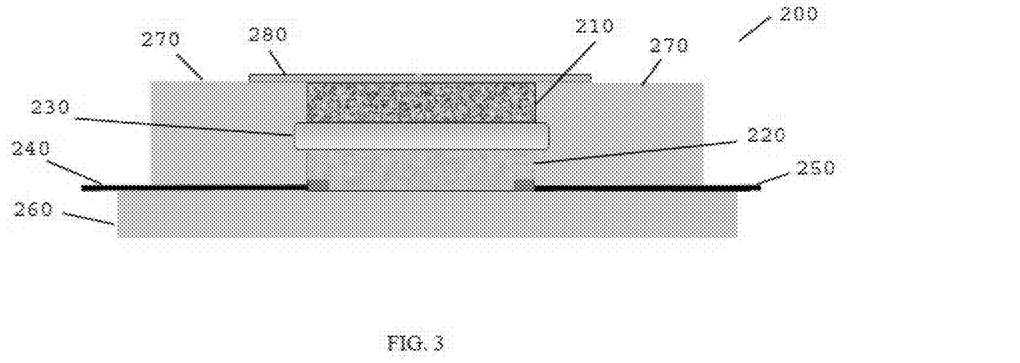
FIG. 3 is a diagram of a sensor device according to an embodiment of the present disclosure.

Referring to FIG. 3, in an example embodiment, the switch 130 can be a sensor device 200 having a dopant layer 210, a conductive polymer 220, and a permeable membrane 230 located between the dopant layer 210 and the conductive polymer 220. When the sensor device 200 reaches a predetermined threshold value of the sensed property, such as temperature or time, the dopant layer 210 may diffuse through the permeable membrane 230 into the conductive polymer 220 to increase the conductivity of the conductive polymer 220. Examples of the conductive polymer include but are not limited to polyacetylene, polypyrrole, and polyaniline. In an example embodiment, the first electrical terminals 140, 150 and the second electrical terminals 160, 170 may be electrically connected to the conductive polymer 220.

The dopant layer 210 may be a small inorganic molecule. Examples of dopants include iodine and a number of ionic salts, such as those with chlorate anions. In an example embodiment, the dopant layer 210 may be a water-based acrylic adhesive layer containing an encapsulated or microencapsulated dopant, for example, as microbeads. The membrane 230 may be configured to have a high permeability to the small inorganic dopant molecules. The change in the conductivity of the sensor device 200 may be affected by many factors, such as the coefficient of diffusion of the dopant layer, the thickness of the conductive polymer layer, temperature, and the exposure time.

In an example embodiment, the membrane 230 is removed from the sensor device 200 such that the dopant layer 210 and the conductive polymer 220 are directly connected to each other. In this embodiment, upon reaching the threshold temperature, the microencapsulation material in the dopant layer 210 starts to melt and the microbeads break open releasing the dopant chemical. As a result, the dopant material in the dopant layer 210 diffuses into the conductive polymer 220 to increase the conductivity.

In a further example embodiment, the sensor device 200 may also include a substrate 260, a support structure 270, and a seal layer 280. The substrate 260 may be an inert material like polyethylene terephthalate (PET). In an example embodiment, the dopant layer 210, the membrane 230, and the conductive polymer 220 are sealed by the substrate 260, the support structure 270, and the seal layer 280 to prevent chemical loss and provide good heat conduction allowing rapid equalization of the temperature of the dopant layer 210 with the outside air temperature.

The sensor device 200 may also include electrode wires 240, 250 electrically connected to the conductive polymer. In an example embodiment, the electrode wires 240, 250 may be electrically connected to the first electrical terminals 140, 150 and/or the second electrical terminals 160, 170. In another example embodiment, the electrode wires 240, 250 may constitute the first electrical terminals 140, 150 and the second electrical terminals 160, 170. The electrode wires 240, 250 may be formed by etched metal such as aluminum or copper on the substrate 260. The electrode wires 240, 250 may be produced by one of any known techniques, including chemical deposition, electrodeposition, vapor deposition, electroless deposition, and printing of conductive ink.

Figure 4:
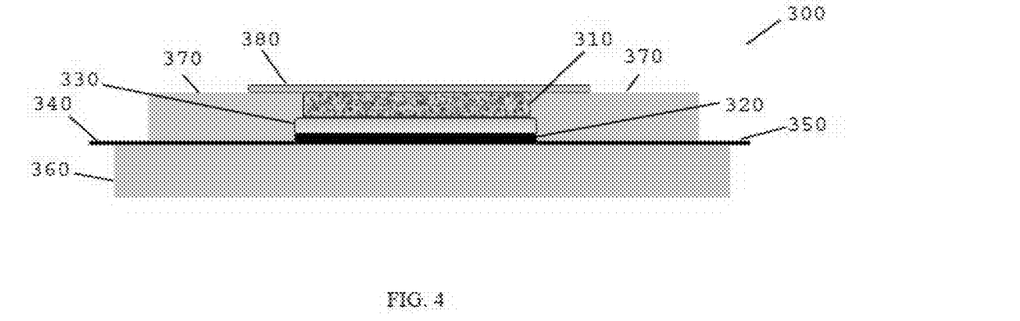
FIG. 4 is a diagram of a sensor device according to an embodiment of the present disclosure.

Referring to FIG. 4, in an example embodiment, the switch 130 can be a sensor device 300 having a chemical etchant layer 310, a conductive metal layer 320, and a permeable membrane 330 located between the chemical etchant layer 310 and the conductive metal layer 320. When the sensor device 300 reaches a predetermined threshold value of the sensed property, such as temperature or exposure time, the chemical etchant layer 310 may diffuse through the membrane 330 into the conductive metal layer 320 to degrade the conductivity of the conductive metal layer 320. In an example embodiment, the first electrical terminals 140, 150 and the second electrical terminals 160, 170 may be electrically connected to the conductive metal layer 320. The etchant layer 310 may be configured to affect the conductivity of the conductive metal layer 320, for example, by destructing the conductive metal layer at a rate that is temperature or exposure time dependent. Examples of materials that can be used for the conductive metal layer 320 include but are not limited to aluminum, copper, zinc, silver, iron, magnesium, tin, chromium, nickel, titanium, indium oxide, indium tin oxide (ITO), and alloys of these metals.

In a further example embodiment, the sensor device 300 may also include a substrate 360, a support structure 370, and a seal layer 380. The substrate 360 may be an inert material like polyethylene terephthalate (PET). In an example embodiment, the etchant layer 310, the membrane 330, and the conductive metal layer 320 are sealed by the substrate 360, the support structure 370, and the seal layer 380 to prevent chemical loss and provide good heat conduction allowing rapid equalization of the temperature of the etchant layer 310 with the outside air temperature.

The sensor device 300 may also include electrode wires 340, 350 electrically connected to the conductive metal layer 320. The electrode wires 340, 350 may be electrically connected to the first electrical terminals 140, 150 and/or the second electrical terminals 160, 170. In an example embodiment, the electrode wires 340, 350 may constitute the first electrical terminals 140, 150 and the second electrical terminals 160, 170. In another example embodiment, the electrode wires 340, 350 may constitute the conductive metal layer 320. The electrode wires 340, 350 may be formed by etched metal such as aluminum or copper on the substrate 360. The electrode wires 340, 350 may be produced by one of any known techniques, including chemical deposition, electrodeposition, vapor deposition, electroless deposition, and printing of conductive ink.

In an example embodiment, the etchant layer 310 may be a solid etchant or an encapsulated etchant that can be melt or released at a specified temperature or exposure time. The etchant layer 310 may be a small inorganic molecule. Examples of the chemical etchants include but are not limited to phosphoric acid and other meltable acidic/basic etchant, such as KI, HCl, KOH, NaOH, and encapsulated ferric chloride solution. In an example embodiment, the chemical etchant layer 310 may include a water-based acrylic adhesive layer, which has a controlled amount of an encapsulated or microencapsulated etchant, for example, as microbeads Referring to FIG. 5, in an example embodiment, the switch 130 can be a sensor device 400 having a first chamber 410 with a gel 420, a second chamber 430, and a permeable membrane 440 located between the first chamber 410 and the second chamber 430. When the sensor device 400 reaches a threshold temperature or exposure time, the gel 420 may pass or diffuse through the membrane 440 into the second chamber 430. The gel 420 may include a conductive additive, allowing an electric current to pass through it. In an example embodiment, the first electrical terminals 140, 150 and the second electrical terminals 160, 170 may be electrically connected to the first chamber 410. In another example embodiment, the first electrical terminals 140, 150 and the second electrical terminals 160, 170 may be electrically connected to the second chamber 430.

Figure 5:
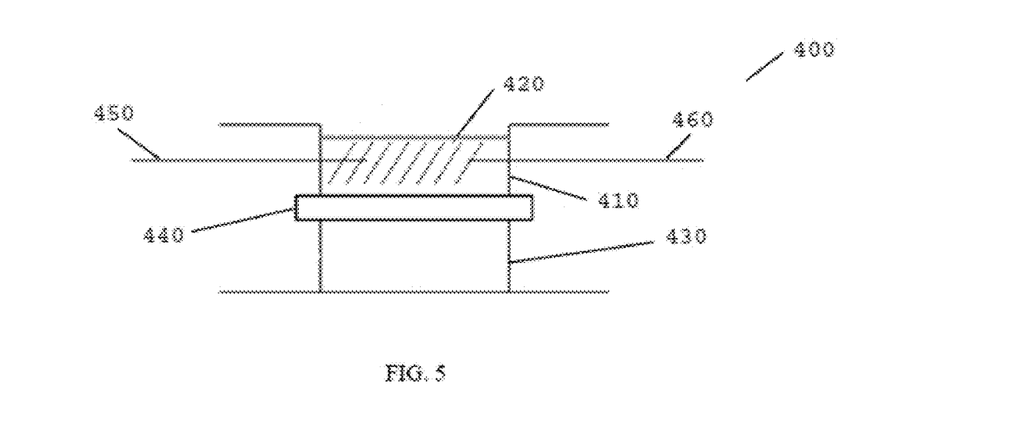
FIG. 5 is a diagram of a sensor device according to an embodiment of the present disclosure.

The sensor device 400 may also include electrode wires 450, 460. The electrode wires can be electrically connected to the first chamber 410 or the second chamber 430 (not shown). If the electrode wires 450, 460 are electrically connected to the first chamber 410, the gel 420 can complete the electrical connection between the electrode wires 450, 460. As the gel 420 in the first chamber 420 passes or diffuses through the membrane 440 at a predetermined value of the sensed property, the first chamber 410 can be empty, and the electrode wires 450, 460 can be electrically disconnected. In this example embodiment, the sensor device 400 is conductive in its default inactivated state.

If the electrode wires 450, 460 are connected to the second chamber 430, as the gel 420 in the first chamber 410 passes or diffuses through the membrane 440 at a predetermined value of the sensed property, the second chamber 430 can be filled with the liquefied gel and the electrode wires 450, 460 can be electrically connected. In that case, the sensor device 400 is non-conductive in its default inactivated state.

In an example embodiment, the electrode wires 450, 460 may be electrically connected to the first electrical terminals 140, 150 and/or the second electrical terminals 160, 170. In another example embodiment, the electrode wires 450, 460 may constitute the first electrical terminals 140, 150 and the second electrical terminals 160, 170.

In an example embodiment, instead of the gel 420 in the sensor device 400, a conductive liquid can be used. When the sensor device 400 reaches a threshold temperature or exposure time, the conductive liquid passes or diffuses through the permeable membrane 440 into the second chamber 430 as a function of exposure time or temperature.

Figure 6:
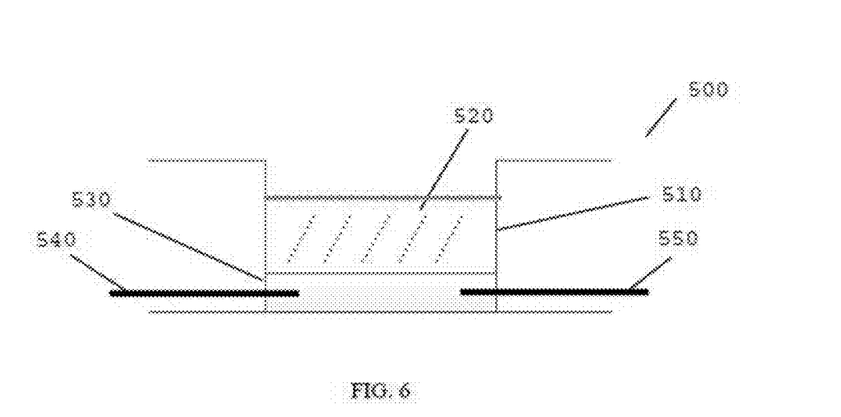
FIG. 6 is a diagram of a sensor device according to an embodiment of the present disclosure.

Referring to FIG. 6, in an example embodiment, the switch 130 can be a sensor device 500 having a chamber 510 with a gel 520 and an absorbent material 530. When the sensor device 500 reaches a threshold temperature or exposure time, the gel 520 may diffuse into the absorbent material 530 as a function of time or temperature. The gel 520 may include a conductive additive, allowing an electric current to pass through it. The absorbent material 530 may not be itself conductive or may be only minimally conductive such that the addition of conductive particles or a conductive liquid in the gel 520 affects the conductivity or resistance of the absorbent material 530. In an example embodiment, the first electrical terminals 140, 150 and the second electrical terminals 160, 170 may be electrically connected to the chamber 510. In another example embodiment, the first electrical terminals and the second electrical terminals 160, 170 may be electrically connected to the absorbent material 530. In a further example embodiment, the absorbent material 530 can be any material known in the art that is capable of absorbing the liquefied gel, such as a fibrous mat.

The sensor device 500 may also include electrode wires 540, 550. The electrode wires can be electrically connected to the chamber 510 or the absorbent material 530. In an example embodiment, the electrode wires 540, 550 may be electrically connected to the first electrical terminals 140, 150 and/or the second electrical terminals 160, 170. In another example embodiment, the electrode wires 540, 550 may constitute the first electrical terminals 140, 150 and the second electrical terminals 160, 170.

The gels disclosed herein take advantage of the ability of some gels to liquefy or behave more like a liquid at certain temperatures. In an example embodiment, the gel behaves more like a liquid than a solid when the temperature increases. In another embodiment, the gel behaves more like a liquid than a solid when the temperature decreases.

According to the present disclosure, the term "gel" includes its generally accepted meaning in the art as well as meaning a colloid in which the dispersed phase has combined with the dispersion medium to produce a semisolid material. It is generally understood that a gel is a solid, jelly-like material that can have properties ranging from soft and weak to hard and tough. Gels can include a substantially dilute cross-linked system, which exhibits no flow when in the steady-state. By weight, many gels are mostly liquid, yet they may behave like solids due to a three-dimensional cross-linked network within the liquid. It is the crosslinking within the fluid that can give a gel its structure (i.e., hardness) and contribute to the adhesive stick (i.e., tack). In this way gels can be a dispersion of molecules of a liquid within a solid in which the solid is the continuous phase and the liquid is the discontinuous phase.

Examples of gels that turn to liquid with decreasing temperature include polyethylene oxide/polypropylene oxide block copolymers such as those commercially available as Pluronics™ and PPO/PEO/PPO triblock polymers commercially available as Poloxomers. There are numerous other examples of this type of polymer including but not limited to hydroxypropyl cellulose, poly(N-ethylacrylamide), poly(N,N'-diethylacrylamide), poly(N-n-propylacrylamide), poly(N-n-propylmethacrylamide), poly(N-isopropylacrylamide), poly(N-isopropylmethacrylamide), poly(N-cyclopropylacrylamide), poly(N-(L)-(1-hydroxymethylpropylmethacrylamide), poly(N-acryloylpyrrolidone), poly(N-acryloylpiperidene), poly(N-vinylcaprolactam), poly(N-vinylpropylacetamide), poly(N-vinyl-5-methyl-2-oxazolidone), poly(N-vinyl isobutyramide), poly(L-proline), poly(N-acryloyl-4-trans-hydroxy-L-proline methyl ester), poly(methyl-2-isobutyracrylate), poly(2-ethyl-2-oxazolidone), poly(2-n-propyl-2-oxazolidone), poly(2-isopropyl-2-oxazolidone), and polyvinyl methyl ether, polyethylene oxide (also known as polyethyleneglycol), poly(propyleneoxide) (also known as poly(propyleneglycol)), poly(ethyleneoxide) and poly(propyleneoxide) copolymers, poly(methylvinylether), poly(-ethoxyethylvinylether), poly(2-(2-ethoxy)ethoxyethylvinylether), poly(4-hydoxybutylvinylether), poly(methylglycidylether), poly(ethylglycidylether), poly(2-ethoxy-2-oxo-1.3.2-dioxaphospholane), poly(2-isopropoxy-2-oxo-1.3.2-dioxaphospholane) and certain synthetic polypeptides.

The temperature at which gels of this type transition from a gel to a liquid, besides being a material property in a given solvent system, can be adjusted up or down with suitable adjuvants or humectants. Thus, the transition temperature for aqueous PEO/PPO polymer gels, and many others, can be adjusted downwards with polyols such as glycerol, mannitol, sorbitol, sucrose, triethanolamine, tris(hydroxymethyl) methane and the like as well as with chaotropes such as ammonium sulfate and the like. Conversely, the transition temperature can be adjusted upwards with simple alcohols, such as, ethanol, propanol as well as some surfactants and kosmotropes and the like. This provides broad formulating ability and control of the transition temperature.

Examples of gels that turn to liquid with increasing temperature include gelatin (which liquefies at 35° C.) and agarose (which liquefies at 60° C.). There are also aqueous and non aqueous gels that can be made by thickening liquid systems with high surface area particulates such as silicas and other micro and nanoparticles. Other examples include carrageenan, agar, and pectin.

Figure 7:
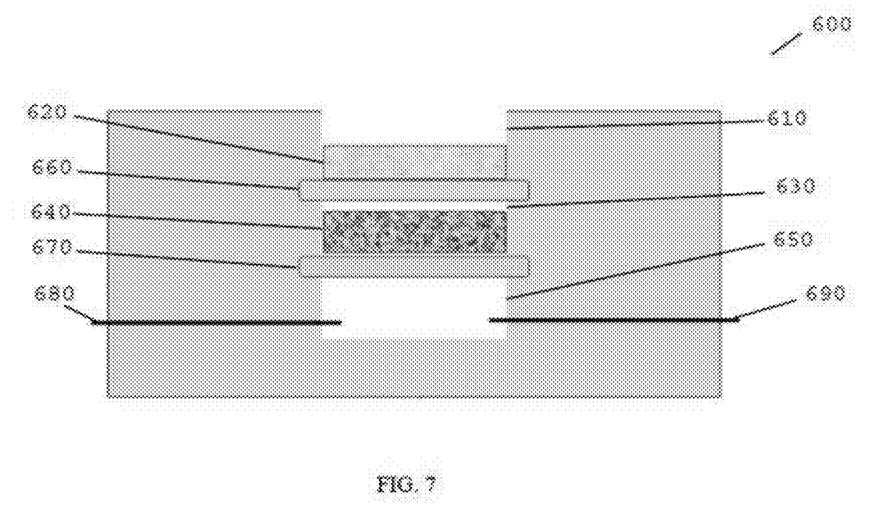
FIG. 7 is a diagram of a sensor device according to an embodiment of the present disclosure.

FIG. 7 shows a sensor device based upon a pH sensitive gel. A pH sensitive gel liquefies in response to a pH change. In an example embodiment, the switch 130 can be a sensor device 600 having a first chamber 610 with a pH modifying liquid 620, a second chamber 630 with a pH sensitive gel 640, which is conductive, a third chamber 650, a first membrane 660 located between the first chamber 610 and the second chamber 630, and a second membrane 670 located between the second chamber 630 and the third chamber 650. When the sensor device reaches a predetermined threshold value of the sensed property, such as temperature or exposure time, the pH modifying liquid 620 may diffuse through the first membrane 660 into the second chamber 630 at a rate that depends on the thermal history. When sufficient pH modifying liquid 620 diffuses or passes through the first membrane 660, the pH sensitive gel 640 turns to liquid, causing the pH sensitive gel 640 to pass or diffuse through the second membrane 670. The first electrical terminals 140, 150 and the second electrical terminals 160, 170 may be electrically connected to either the first 610, second 630, or third chamber 650. In an example embodiment, the third chamber may be empty or filled with an absorbent material. Examples of the pH sensitive gel include cellulose, poly(acrylamide-co-acrylic acid), poly(styrene-co-vinyl pyridine), and poly(n-alkyl methacrylate-co-diethylaminoethyl methacrylate).

The sensor device 600 may also include electrode wires 680, 690. The electrode wires 680, 690 can be electrically connected to the first 610, second 630, or third chamber 650. Depending on where the electrode wires 680, 690 are electrically connected, at a predetermined value of the sensed property, the electrode wires 680, 690 can be electrically connected or disconnected. For example, if the electrode wires 680, 690 are electrically connected to the third chamber 650, as the pH sensitive gel 640 in the second chamber 630 passes or diffuses through the second membrane 670 at a predetermined value of the sensed property, the third chamber 650 is filled with the liquefied gel and the electrode wires 680, 690 can be electrically connected.

In an example embodiment, the electrode wires 680, 690 may be electrically connected to the first electrical terminals 140, 150 and/or the second electrical terminals 160, 170. In another embodiment, the electrode wires 680, 690 may constitute the first electrical terminals 140, 150 and the second electrical terminals 160, 170

With continuing reference to FIG. 7, in an example embodiment, instead of a pH sensitive gel and the pH modifying liquid, a thermo-responsive hydrogel can be used with an alcohol or other adjuvant in the sensor device 600. When the sensor device reaches a threshold temperature or exposure time, the alcohol or other adjuvant may diffuse through the first membrane 660 into the second chamber 630 and turns the thermo-responsive hydrogel to liquid, causing the thermo-responsive hydrogel to pass through the second membrane 670.

In an example embodiment, the gel may include a conductive polymer film such as a hydroxypropyl cellulose film made conductive by being filled, for example, with particulate silver or graphite or graphene oxide. In an example embodiment, a water or alcohol filled capsule, which is designed to melt at a specified temperature or exposure time, can be used to liquefy the gel.

Referring to FIG. 3-5 or 7, the membrane used for the sensor devices 200-400, 600 can be a porous material or any type of membrane known in the art that is capable of allowing certain molecules or ions to pass or diffuse through it.

Figure 8:
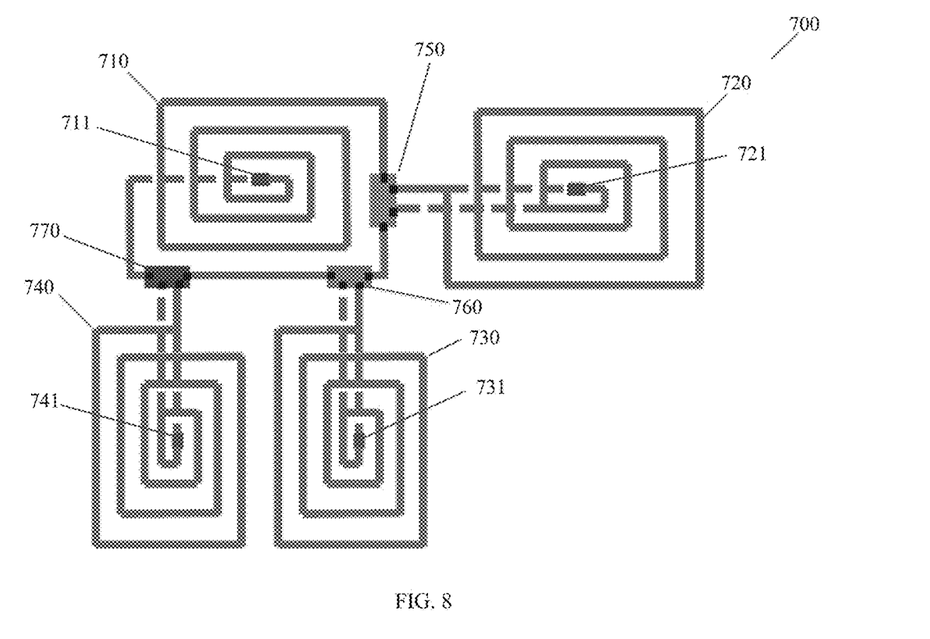
FIG. 8 is a diagram of a sensor system according to an embodiment of the present disclosure.

Referring to FIG. 8, in an example embodiment, a system 700 may include a primary RFID tag 710 and multiple secondary RFID tags, for example, a first secondary RFID tag 720, a second secondary RFID tag 730, and a third secondary RFID tag 740. The system 700 may also include multiple switches, for example, a first switch 750, a second switch 760, and a third switch 770. The switches 750, 760, 770 may be electrically connected to the antenna of the primary RFID tag 710 and the antennas of the secondary RFID tags 720, 730, 740. Each switch 750, 760, 770 may be electrically connected with the primary RFID tag 710 and one of the secondary RFID tags 720, 730, 740 in a manner that either the primary RFID tag or at least one of the secondary RFID tags 720, 730, 740 is activated at a time. In another example embodiment, each switch 750, 760, 770 may be electrically connected with the primary RFID tag 710 and one of the secondary RFID tags 720, 730, 740 in a manner that the primary RFID tag 710 and the secondary RFID tags 720, 730, 740 are not activated at the same time. For example, the second switch 760 may be electrically connected with the primary RFID tag 710 and the second secondary RFID tag 730 in a manner that the primary RFID tag 710 and the second secondary RFID tag 730 are not activated at the same time. That is, at most one of the primary RFID tag 710 and the second secondary RFID tag 730 is activated at a time. The first and third switches 750, 770 may be electrically connected with the first secondary RFID tag 720 and the third RFID tag 740 in the same manner, respectively.

In an example embodiment, the primary tag 710 is activated whereas all the secondary tags 720, 730, 740 are deactivated in its default state. If any one of the secondary tags 720, 730, 740 is activated due to the change in environment condition, the primary tag 710 is deactivated and only the output from the activated secondary tag is read by the reader. In another example embodiment, the primary tag 710 is deactivated whereas all the secondary tags 720, 730, 740 are activated in its default state. If any of the secondary tags 720, 730, 740 are deactivated due to the change in environment condition, the primary tag 710 is activated and the output from the activated primary tag 710 is read by the reader.

Remaining features and characteristics of the sensor system 700 illustrated and described with respect to FIG. 8 can otherwise be similar or the same as those described with the embodiments depicted in FIGS. 1-7 including but not limited to the possible presence and configurations of the antennas, electrical terminals, and sensor devices.

Figure 9:
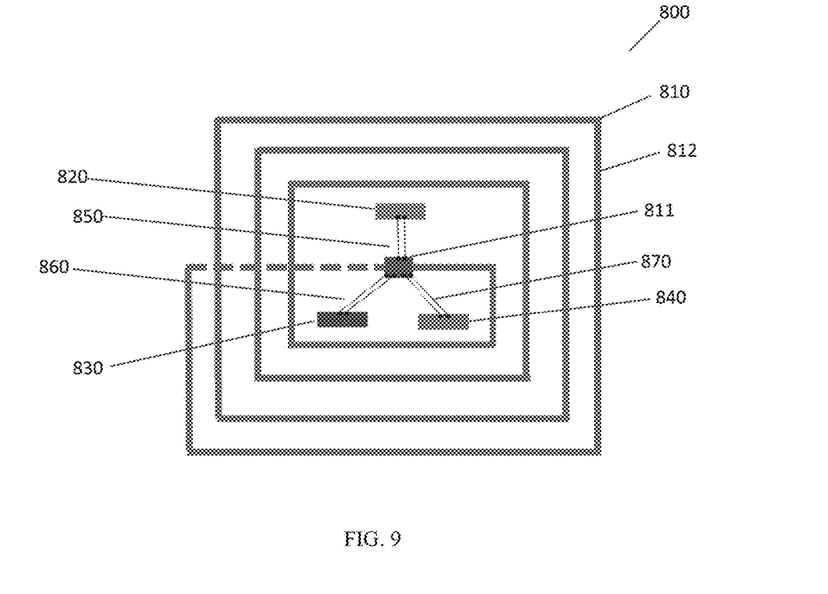
FIG. 9 is a diagram of a sensor system according to an embodiment of the present disclosure.

Referring to FIG. 9, in an example embodiment, a system 800 may include a RFID tag 810 having an integrated circuit 811 and an antenna 812, and a plurality of sensor devices 820, 830, 840, which are electrically coupled to the integrated circuit 811. The system 800 may further include electrical connections 850, 860, 870 between the integrated circuit 811 and the plurality of sensor devices 820, 830, 840. The integrated circuit 811 may be configured to sense whether each of the plurality of sensor devices 820, 830, 840 is in a conductive state or in a non-conductive state, and produce a different output depending on the conductivity state of each of the sensor devices 820, 830, 840. In an example embodiment, the integrated circuit 811 may be a customized chip that can sense multiple sensor devices. The output may be adapted to be transmitted through the antenna 812 to a reader. In an example embodiment, each of the electrical connections 850, 860, 870 may consist of at least two electrical terminals.

Remaining features and characteristics of the sensor system 800 illustrated and described with respect to FIG. 9 can otherwise be similar or the same as those described with the embodiments depicted in FIGS. 1-7 including but not limited to the configurations of the sensor devices as well as the connections of any of the electrical terminals with the sensor devices.

The sensor systems 100, 700, 800 may be used for a temperature-sensitive product having a host product (not shown), a container containing the host product, and the sensor systems. The systems 100, 700, 800 may be attachable to the container.

Examples of host products include vaccines, drugs, medication, pharmaceuticals, cosmeceuticals, nutricosmetics, nutritional supplements, biological materials for industrial or therapeutic uses, food stuffs, medical devices, prophylactics, cosmetics, beauty aids, and perishable munitions and ordnance.

The foregoing description of embodiments of the present disclosure has been provided for the purposes of illustration and description. It is not intended to be exhaustive or to limit the invention to the precise forms disclosed. Obviously, many modifications and variations will be apparent to the practitioner skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A sensor system comprising:
a primary RFID tag and a secondary RFID tag, each RFID tag comprising an antenna and an integrated circuit electrically connected to the antenna;
a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time;
at least two first electrical terminals electrically connecting the primary RFID tag to the switch; and
at least two second electrical terminals electrically connecting the secondary RFID tag to the switch,
wherein the switch has a conductive state and a non-conductive state, and when the switch is in the conductive state, the switch completes an electrical connection from the antenna of the primary RFID tag with the integrated circuit of the primary RFID tag such that the primary RFID tag is activated and an electrical connection from the antenna of the secondary RFID tag with the integrated circuit of the secondary RFID tag is shorted such that the secondary RFID tag is deactivated, and
wherein when the switch is in the non-conductive state, the switch opens the electrical connection from the antenna of the primary RFID tag with the integrated circuit of the primary RFID tag such that the primary RFID tag is deactivated and a short of the electrical connection from the antenna of the secondary RFID tag with the integrated circuit of the secondary RFID tag is removed such that the secondary RFID tag is activated.

2. The sensor system of claim 1, wherein a change in the state of the switch is permanent, providing an irreversible indication of a temperature event.

3. The sensor system of claim 1, wherein the switch comprises a sensor device selected from the group consisting of a thermal history sensor, a high-temperature threshold sensor, a low-temperature threshold sensor, a freeze sensor, a melt sensor, a time temperature sensor, and a combination of the sensors thereof.

4. The sensor system of claim 1, wherein the primary RFID tag or the secondary RFID tag comprises a passive tag.

5. The sensor system of claim 1, wherein the system is attached to or supported by a host product.

6. A sensor system comprising:
a primary RFID tag and a secondary RFID tag, each RFID tag comprising an antenna and an integrated circuit electrically connected to the antenna;
a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time;
at least two first electrical terminals electrically connecting the primary RFID tag to the switch;
at least two second electrical terminals electrically connecting the secondary RFID tag to the switch,
an additional secondary RFID tag having an antenna and an integrated circuit electrically connected to the antenna;
an additional switch being electrically connected to the antenna of the primary RFID tag and the antenna of the additional secondary RFID tag and being electrically connected with the primary RFID tag and the additional secondary RFID tag in a manner that the primary RFID tag and the additional secondary RFID tag are not activated at the same time;
at least two third electrical terminals electrically connecting the primary RFID tag to the additional switch; and
at least two fourth electrical terminals electrically connecting the additional secondary RFID tag to the additional switch.

7. A sensor system comprising:
a primary RFID tag and a secondary RFID tag, each RFID tag comprising an antenna and an integrated circuit electrically connected to the antenna;

a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time;

at least two first electrical terminals electrically connecting the primary RFID tag to the switch;

at least two second electrical terminals electrically connecting the secondary RFID tag to the switch, wherein the switch comprises a sensor device having a dopant layer, a conductive polymer, and a permeable membrane located between the dopant layer and the conductive polymer, wherein when the sensor device reaches a threshold temperature, the dopant layer diffuses through the permeable membrane into the conductive polymer to increase the conductivity of the conductive polymer, and wherein the at least two first electrical terminals and the at least two second electrical terminals are electrically connected to the conductive polymer.

8. The sensor system of claim 7, wherein the dopant layer comprises a waterbased acrylic adhesive layer containing a microencapsulated dopant.

9. A sensor system comprising:

a primary RFID tag and a secondary RFID tag, each RFID tag comprising an antenna and an integrated circuit electrically connected to the antenna;

a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time;

at least two first electrical terminals electrically connecting the primary RFID tag to the switch;

at least two second electrical terminals electrically connecting the secondary RFID tag to the switch, wherein the switch comprises a sensor device having a chemical etchant layer, a conductive metal layer, and a permeable membrane located between the chemical etchant layer and the conductive metal layer, and wherein when the sensor device reaches a threshold temperature, the chemical etchant layer diffuses through the membrane into the conductive metal layer to degrade the conductivity of the conductive metal layer.

10. The sensor system of claim 9, wherein the at least two first electrical terminals and the at least two second electrical terminals are electrically connected to the conductive metal layer.

11. The sensor system of claim 9, wherein the chemical etchant layer comprises a water-based acrylic adhesive layer containing a microencapsulated etchant.

12. A sensor system comprising:

a primary RFID tag and a secondary RFID tag, each RFID tag comprising an antenna and an integrated circuit electrically connected to the antenna;

a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time;

at least two first electrical terminals electrically connecting the primary RFID tag to the switch;

at least two second electrical terminals electrically connecting the secondary RFID tag to the switch, wherein the switch comprises a sensor device having a first chamber with a conductive liquid, a second chamber, and a permeable membrane located between the first chamber and the second chamber, and wherein when the sensor device reaches a threshold temperature, the conductive liquid diffuses through the membrane into the second chamber.

13. The sensor system of claim 12, wherein the at least two first electrical terminals and the at least two second electrical terminals are electrically connected to the first chamber.

14. A sensor system comprising:

a primary RFID tag and a secondary RFID tag, each RFID tag comprising an antenna and an integrated circuit electrically connected to the antenna;

a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time;

at least two first electrical terminals electrically connecting the primary RFID tag to the switch;

at least two second electrical terminals electrically connecting the secondary RFID tag to the switch, wherein the switch comprises a sensor device having a first chamber with a gel, a second chamber, and a permeable membrane located between the first chamber and the second chamber, and wherein when the sensor device reaches a threshold temperature, the gel passes through the permeable membrane into the second chamber.

15. The sensor system of claim 14, wherein the at least two first electrical terminals and the at least two second electrical terminals are electrically connected to the first chamber.

16. A sensor system comprising:

a primary RFID tag and a secondary RFID tag, each RFID tag comprising an antenna and an integrated circuit electrically connected to the antenna;

a switch being electrically connected to the antenna of the primary RFID tag and the antenna of the secondary RFID tag and being electrically connected with the primary RFID tag and the secondary RFID tag in a manner that the primary RFID tag and the secondary RFID tag are not activated at the same time;

at least two first electrical terminals electrically connecting the primary RFID tag to the switch;

at least two second electrical terminals electrically connecting the secondary RFID tag to the switch, wherein the switch comprises a sensor device having a first chamber with a pH modifying liquid, a second chamber with a pH sensitive gel, a third chamber, a first membrane located between the first chamber and the second chamber, and a second membrane located between the second chamber and the third chamber, and wherein when the sensor device reaches a threshold temperature, the pH modifying liquid diffuses through the first membrane into the second chamber and turns the pH sensitive gel to liquid, causing the pH sensitive gel to pass through the second membrane.

17. The sensor system of claim 16, wherein the at least two first electrical terminals and the at least two second electrical terminals are electrically connected to the third chamber.

18. A temperature-sensitive product, comprising:
a host product;
a container containing the host product; and
the sensor system of claim 1,
wherein the sensor system is attached to the container.

19. The temperature-sensitive product of claim 18, wherein the host product is selected from the group consisting of a vaccine, a drug, a medication, a pharmaceutical, a cosmeceutical, a nutricosmetic, a nutritional supplement, a biological material, a food stuff, a medical device, a prophylactic, a cosmetic, a beauty aid, and a perishable munition and ordnance.

20. The temperature-sensitive product of claim 19, wherein the product is a vaccine.

* * * * *